(12) United States Patent
Bentley

(10) Patent No.: US 6,206,762 B1
(45) Date of Patent: Mar. 27, 2001

(54) METHOD AND APPARATUS FOR CUTTING MULTS FROM A BILLET

(76) Inventor: Richard Bentley, 1315 Robert Ct., Brea, CA (US) 92821

( * ) Notice: Subject to any disclaimer, the term of this patent is extended or adjusted under 35 U.S.C. 154(b) by 0 days.

(21) Appl. No.: 09/076,226

(22) Filed: May 11, 1998

(51) Int. Cl.$^7$ ....................................................... B24B 1/00
(52) U.S. Cl. ............................................ 451/49; 83/766
(58) Field of Search .............................. 451/8, 9, 10, 49, 451/53, 178, 449; 83/54, 100, 168, 169, 170, 171, 277, 278, 767

(56) References Cited

U.S. PATENT DOCUMENTS

| | | | |
|---|---|---|---|
| 2,745,222 | * | 5/1956 | Charf et al. ............................... 451/6 |
| 4,607,461 | * | 8/1986 | Adams ..................................... 451/14 |
| 4,811,524 | * | 3/1989 | Corallo .................................... 451/9 |
| 5,069,234 | * | 12/1991 | Nielsen ................................. 134/113 |
| 5,070,655 | * | 12/1991 | Aggarwal ................................. 451/5 |
| 5,076,022 | * | 12/1991 | Ohta et al. ............................... 451/5 |
| 5,289,660 | * | 3/1994 | Terasaki et al. ........................ 451/49 |
| 5,386,665 | * | 2/1995 | Heim ....................................... 451/5 |
| 5,441,438 | * | 8/1995 | Bishop ..................................... 451/5 |
| 5,562,526 | * | 10/1996 | Yoneda et al. ........................... 451/9 |
| 5,595,525 | * | 1/1997 | Hayashi et al. .......................... 451/5 |
| 5,616,070 | * | 4/1997 | Rice et al. .............................. 451/62 |
| 5,620,358 | * | 4/1997 | Furukawa ................................ 451/22 |

* cited by examiner

Primary Examiner—David A. Scherbel
Assistant Examiner—David B Thomas
(74) Attorney, Agent, or Firm—Beehler & Pavitt; David A. Belasco; William H. Pavitt, Jr.

(57) ABSTRACT

A method and apparatus for cutting mults from a billet is described. The invention includes a rigid machine bed affixed to a horizontal mounting surface. A rotating headstock, capable of at least one speed is permanently mounted to the machine bed. The headstock has an opening through it capable of accommodating an elongated billet of a high-strength alloy. A pair of three-jaw chucks are removably attached to the front and rear faces of the rotating headstock for mounting of billets of regular cross-section. A pair of four-jaw chucks are removably attached to the front and rear faces of the rotating headstock for mounting of billets of irregular cross-section. An abrasive cut-off wheel is removably mounted to a rotating saw arbor. The saw arbor is pivotally mounted parallel to the axis of rotation of the headstock. The pivotal mounting for the saw arbor is slidably mounted to the machine bed so that the distance form the cut-off wheel to the front face of the headstock may be varied by the operator to cut mutts (multiples) of varying length. A digital readout and incremental adjustment means are provided to control the movement of the saw arbor along the length of the billet. Both automatic and manual means are provided to cause the cut-off wheel to pivot toward the rotating billet clamped within the headstock. Means are provided to control the surface cutting speed of the cut-off wheel as it decreases in size from wear. Means are also provided to cool the cut-off wheel and billet as the billet is cut into mutts as are means to remove particulate matter from the exhaust stream from the cut-off wheel. When the operator desires to cut a billet of regular cross-section, the three-jaw chucks and automatic saw feed are employed. When the operator desires to cut a billet of irregular cross-section, the independently adjustable four-jaw chucks and manual saw feed are employed.

14 Claims, 5 Drawing Sheets

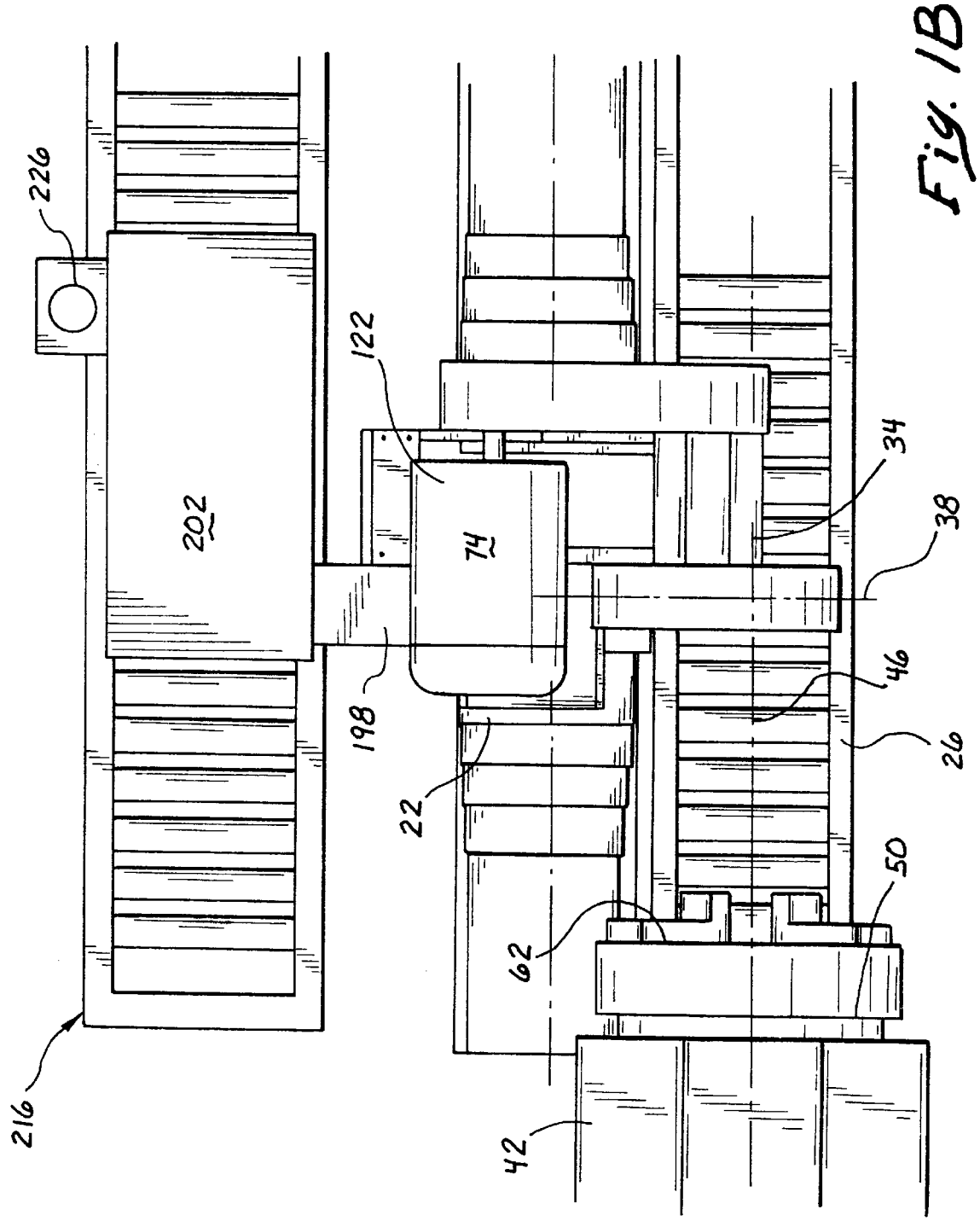

METHOD AND APPARATUS FOR CUTTING MULTS FROM A BILLET

FIELD OF INVENTION

The invention pertains to metal cutting and grinding machines. More particularly, the invention relates to machines that employ abrasive cut-off wheels to divide metal billets into precision measured sections for further processing.

BACKGROUND OF THE INVENTION

High-grade nickel-steel alloys and related materials are typically used for the manufacture of aircraft parts and other high-stress, high-temperature applications. These materials are necessarily difficult to cut or machine and tend to be expensive so waste should be avoided. Cutting of these high-strength alloys usually requires the use of abrasive cut-off wheels that are consumed in the cutting process, posing a potential air pollution hazard for the machine operator and those nearby. It is often desirable to divide a rough billet of such material into nearly identical size multiples or "mults" for further forging or machining. If the mults can be identically sized and a minimum of material lost in the cutting, the process will be more economical.

Various types of machines have been developed for precision cutting of billets. Examples include: U.S. Pat. No. 5,109,740 issued to Kohn et al. is directed to a billet cut-off control in which the shearing system is controlled by information detected as the logs emerge from the furnace. The detection system comprises an electric eye unit and an eddy-current detector that are mounted on the side of the path of the logs emerging from the furnace.

U.S. Pat. No. 5,031,493 issued to Dorr, is directed to an ultrasonic control system for shearing-type cut-off machines. The mechanism is controlled by ultrasonically measuring the bar stock and adjusting the length of sheared bar stock to assure a uniform volume in the sheared product.

U.S. Pat. No. 5,678,466, issued to Wahl is directed to a process and a device for lubricating and cooling cutting edges and/or workpieces in machining processes with chip removal. Fluids are fed to the cutting edges or workpieces in the machining operation, thus providing the cooling while chip removal collects the waste material and allows for recovering the material in order to decrease the cost of the operation.

U.S. Pat. No. 5,084,972 issued to Waugh is directed to a device for collecting dust from a portable circular saw. Such dust collecting is desirable and virtually essential to the safe and economical operation of billet cutting operations.

U.S. Pat. No. Re. 33,904 issued to Rudy et al. is directed to a method and apparatus for automatically cutting food products to predetermined weight or shape. As the food products move along a conveyor, a camera provides a programmed computer with dimensional data and thus the computer is able to control the operation of the cutters in order to cut the material into portions of equal weight.

U.S. Pat. No. 4,347,770 issued to Mosey et al. describes an apparatus for radially cutting cylindrical material having an idling roller, a clamping roller, and a driven roller geared to a circular saw arbor constraining and rotating the cylindrical stock against the saw blade.

Finally, U.S. Pat. No. 4,901,611 issued to the present inventor, discloses a machine which employs an abrasive cut-off wheel that engages a rotating billet by being driven downwardly toward the billet along an angled ramp.

While other inventions exist having features desirable for efficient cutting of mults from billets the above-described designs for cut-off machinery and related features are typical of those encountered in the prior art.

It is an objective of the present invention to provide for cutting of mults of precisely described dimensions from billets of high-strength alloys. It is a further objective to provide such precision cutting with a minimum of waste. It is yet a further objective to permit the safe and economical cutting of mults from both cylindrical billets and those of irregular cross-section. It is yet another objective of the invention to provide a means for efficiently recycling the waste material produced by the cutting process while minimizing any pollution produced by the process. It is still another objective to provide a means to maintain a constant surface speed of the cutting means with respect to the billet despite wear of the cutting means. It is a still further objective of the invention to control the temperature of the cutting process to maximize cutting speed while minimizing heat distortion and wear of the cutting means. Finally, it is an objective of the invention to provide the above-described capabilities in an inexpensive and durable machine, which is capable of extended duty cycles, and that may be easily repaired and maintained.

While some of the objectives of the present invention are satisfied by features disclosed in the prior art, none of the inventions found include all of the requirements identified.

SUMMARY OF THE INVENTION

The present invention addresses all of the deficiencies of prior art billet cutting methods and machinery and satisfies all of the objectives described above.

An apparatus for cutting mults from a billet, in the form of an elongated casting of a high strength alloy, may be constructed from the following components. A horizontal mounting surface and a machine bed having a planar surface disposed parallel to the mounting surface. The planar surface has a long axis and a short axis. A rotating headstock is fixedly attached to the machine bed and has a first axis of rotation parallel to the long axis of the planar surface. The headstock has a front face and a rear face located parallel to each other and orthogonal to the long axis of the planar surface.

The headstock is capable of providing rotation at least one speed and capable of providing rotation in at least one direction. The headstock has an orifice extending from the front face to the rear face of sufficient size to accommodate a billet. The front face of the headstock is adapted to removably attach a clamping means parallel to the front face. The rear face of the headstock is adapted to removably attach a clamping means parallel to the rear face.

A pivotally mounted saw arbor is movably mounted parallel to the first axis of rotation. The saw arbor rotates about a second axis parallel to and spaced from said first axis. A means for rotating the saw arbor at a plurality of pre-selected speeds is provided along with a means for changing the pre-selected speeds at which the saw arbor may be rotated. An abrasive cut-off wheel is removably mounted to the saw arbor. A means is provided for controlling the distance from the abrasive cut-off wheel to the front face of the headstock and thereby allowing the operator to determine the length of the mult to be cut from the billet.

A means is provided for causing the abrasive cut-off wheel to pivot toward the billet, thereby causing the rotating cut-off wheel to engage the rotating billet to cut the billet into pre-determined mults while producing particulate matter. A means is also provided for cooling the abrasive cut-off wheel and the billet and for removing and collecting particulate material produced by the cutting process from the vicinity of the abrasive cut-off wheel.

In one variation of the invention the clamping means removably attached to the front face of the headstock comprises an independently adjustable four-jaw chuck. In another variation the clamping means removably attached to the front face of the headstock comprises a self-centering three-jaw chuck. In still another variation the clamping means removably attached to the rear face of the headstock comprises an independently adjustable four-jaw chuck. In yet another variation of the invention the clamping means removably attached to the rear face of the headstock comprises a self-centering three-jaw chuck.

In another variation of the invention the means for rotating the saw arbor is an electric motor capable of at least one speed. In still a further variation the means for controlling the rotational speed of the saw arbor further comprises a Hertz converter connected to the electric motor and a controlling means connected to the Hertz converter. A means is provided for determining an appropriate number of Hertz to be provided to the electric motor for a desired cutting speed under varying conditions. When the diameter of the abrasive cut-off wheel is diminished through use it is desired to increase the speed of the saw arbor, thereby maintaining a relatively constant cutting speed for an outer edge of the wheel. The number of Hertz provided to the electric motor may be increased, thereby increasing the rotational speed of the saw arbor without decreasing the power applied to the cut-off wheel.

In still a further variation of the invention the means for controlling the distance from the abrasive cut-off wheel to the front face of the headstock comprises an incrementally controllable feed device capable of displacing the cut-off wheel from the front face of the headstock. The feed device maintains the orthogonal relationship between the cut-off wheel and the rotational axis of the headstock. A digital display illustrates the displacement of the cut-off wheel from the front face of the headstock. A switching means is provided for controlling the feed device based on output from the digital display. When the operator desires to adjust the length of the mult to be cut from the billet he may vary the displacement of the cut-off wheel from the front face of the headstock using the switching means and the output from the digital display.

In another variation of the invention the means for causing the abrasive cut-off wheel to pivot toward the billet comprises a pivotal mounting for the saw arbor and the means for rotating said saw arbor. The pivotal mounting is movably mounted parallel to the machine bed and includes a pivoting portion and a non-pivoting portion. A hydraulic cylinder is disposed between the pivoting portion and the non-pivoting portion of the pivotal mounting. A hydraulic pump, hydraulic fluid, valving, hoses, and control means are provided to permit the hydraulic cylinder to cause the cut-off wheel to engage the billet to maintain such engagement as the portion of the billet to be cut becomes smaller.

A means is provided for disengaging the hydraulic cylinder from the pivotal mounting or the saw arbor so that the cut-off wheel may be manually pivoted toward and away from the billet. When the operator desires to cut a billet of irregular cross-section, the pivotal mounting or the saw arbor may be disconnected from the hydraulic cylinder. This permits the operator to manually apply pressure to cause the cut-off wheel to engage the billet as may be required by the shape of the billet.

In still another variation the means for cooling the abrasive cut-off wheel and the billet further comprises cooling fluid and a nozzle fixedly attached to the pivoting portion of the pivotal mounting for the saw arbor. The nozzle is adjustable so that cooling fluid may be directed to the cut-off wheel adjacent the point at which the wheel engages the billet. A cooling fluid pump is provided that is capable of producing at least one pressure level, as is a fluid reservoir and tubing connecting the reservoir to the pump and connecting the pump to the nozzle. A means is provided for collecting cooling fluid from the vicinity of the cut-off wheel and returning the fluid to the reservoir.

In yet another variation of the invention the means for removing and collecting particulate material produced by the cutting process from the vicinity of the abrasive cut-off wheel comprises a collection chute positioned adjacent the point at which the cut-off wheel engages the billet and a vacuum system. The vacuum system has an intake end and an exhaust end. A hose connects the chute to the intake end of the vacuum system and a separator unit is connected to the exhaust end of the vacuum system. The separator unit is capable of removing particulate matter from the air handled by the vacuum system and depositing the particulate matter in a container. A conveyor section is located beneath the vacuum system and separator unit. The conveyor section enables the vacuum system and separator unit to move slidably with the pivotal mounting for the saw arbor. An exhaust system ducts the air from the separator unit to a location remote from apparatus for cutting mults from billets.

The invention includes a method for cutting mults from billets of substantially regular cross-section. The method comprises selecting a billet having a substantially regular cross-section and clamping the billet in the rotating headstock using the three-jaw chuck mounted to the front face of the headstock and the three-jaw chuck mounted to the rear face of the headstock. The clamping of the billet is then adjusted using an indicating device to minimize rotational wobble of the billet. Next the displacement of the cut-off wheel from the front face of the headstock is set using the digital display and switching means to determine the point at which to cut the billet.

The operator then determines the appropriate number of Hertz to be input to the means for rotating the saw arbor based on the cut-off wheel diameter and desired cutting speed. The determined number of Hertz is next to the means for rotating the saw arbor and the means for cooling the abrasive cut-off wheel and fluid recovery system is activated. Next, the means for removing and collecting particulate material produced by the cutting process from the vicinity of the abrasive cut-off wheel is activated and the means for causing the abrasive cut-off wheel to pivot toward the billet is engaged. The operator then monitors the cutting of the mult from the billet.

The invention also includes a method for cutting mults from billets of irregular cross-section. The method comprises selecting a billet having an irregular cross-section and clamping the billet in the rotating headstock using the four-jaw chuck mounted to the front face of the headstock and the four-jaw chuck mounted to the rear face of the headstock. The clamping of the billet is then adjusted using an indicating device to minimize rotational wobble of the billet. The operator then sets the displacement of the cut-off wheel from the front face of the headstock using digital display and switching means to determine the point at which to cut the billet.

Next the operator determines the appropriate number of Hertz to be input to the means for rotating the saw arbor based on the cut-off wheel diameter and desired cutting speed. The appropriate number of Hertz to be input to the means for rotating the saw arbor is then provided. The operator next activates the means for cooling the abrasive cut-off wheel and fluid recovery system. Next, the means for removing and collecting particulate material produced by the cutting process from the vicinity of the abrasive cut-off wheel is activated. The operator then causes the abrasive cut-off wheel to pivot toward the billet by manually pulling a handle removably attached to the pivoting portion of the pivotal mounting. The operator pulls the handle toward the rotating billet so as to maintain an even cutting pressure on the billet while monitoring the cutting of the mult from the billet.

DESCRIPTION OF THE DRAWINGS

FIG. 1b is an enlarged plan view of the of the FIG. 1 embodiment illustrating the rotating headstock, pivoting saw arbor and exhaust system;

DETAILED DESCRIPTION OF THE PREFERRED EMBODIMENT

Figure 1:
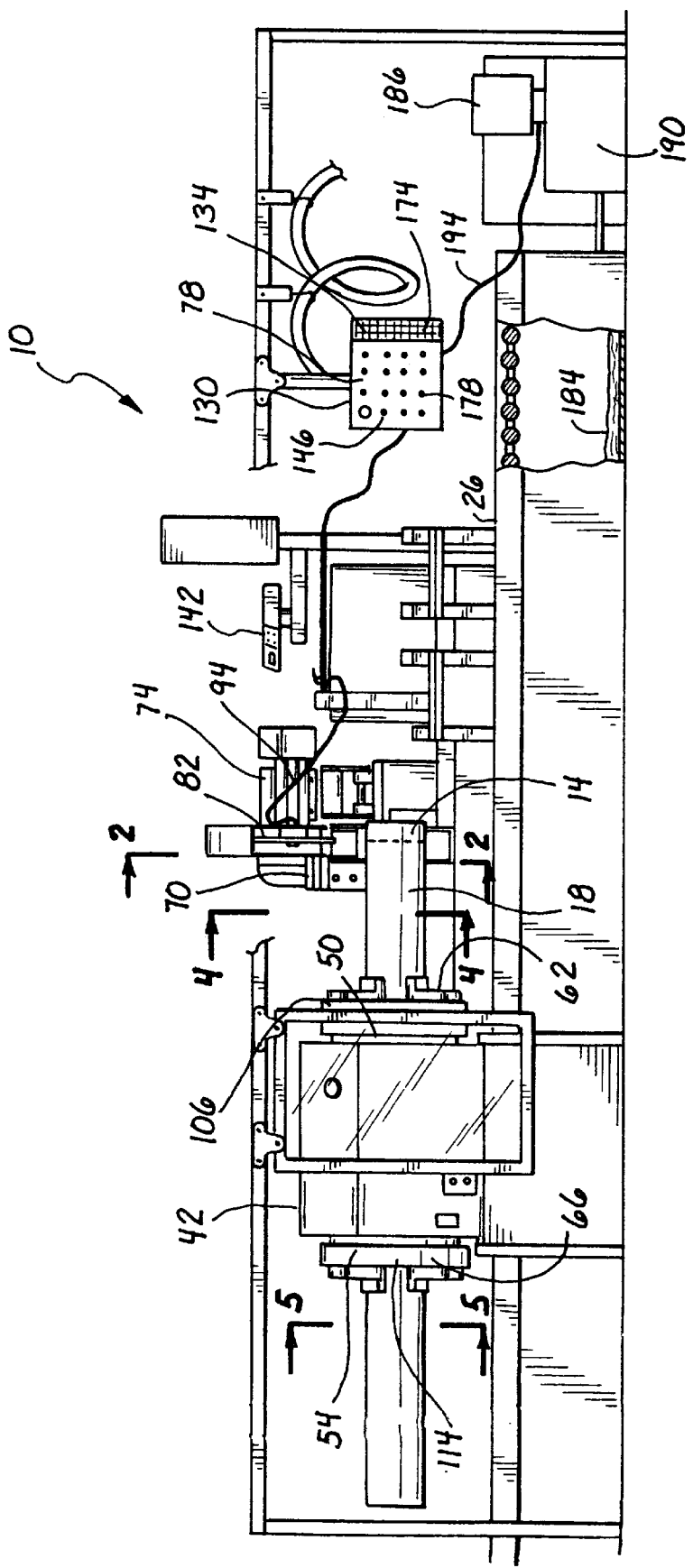
FIG. 1 is a side elevation of the preferred embodiment of the invention illustrating the abrasive cut-off wheel, pivoting saw arbor and rotating headstock.
Figure 1A:
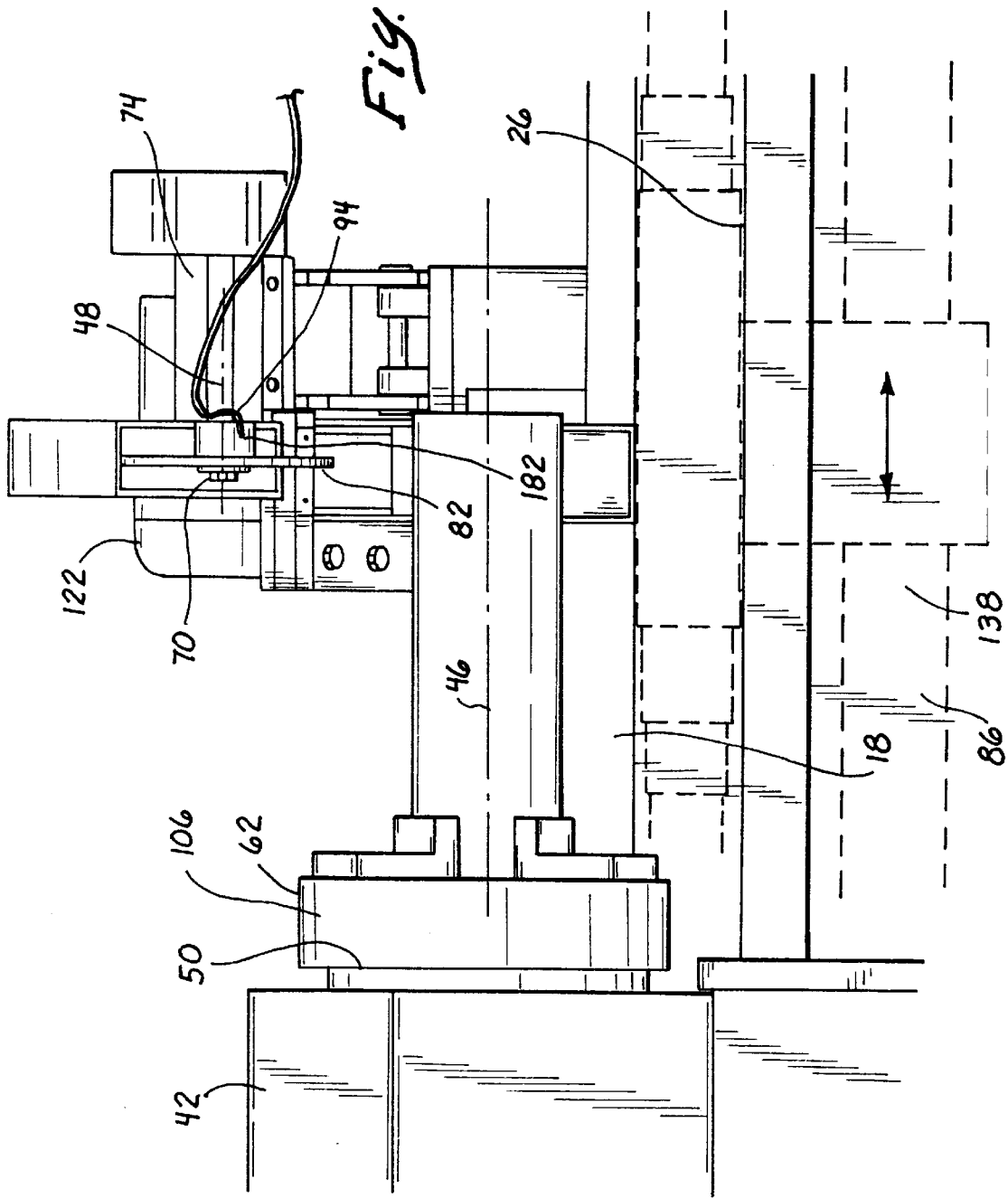
FIG. 1a is an enlarged side elevation view of the of the FIG. 1 embodiment illustrating the abrasive cut-off wheel, pivoting saw arbor and rotating headstock.

FIGS. 1, 1a and 1b illustrate an apparatus 10 for cutting mults 14 from a billet 18 in the form of an elongated casting of a high strength alloy comprising the following components. A horizontal mounting surface 22 and a machine bed 26 having a planar surface 30 disposed parallel to the mounting surface 22. The planar surface 30 has a long axis 34 and a short axis 38. A rotating headstock 42 is fixedly attached to the machine bed 26 and has a first axis of rotation 46 parallel to the long axis 34 of the planar surface 30. The headstock 42 has a front face 50 and a rear face 54 located parallel to each other and orthogonal to the long axis 34 of the planar surface 30.

The headstock 42 is capable of providing rotation at least one speed and capable of providing rotation in at least one direction. The headstock 42 has an orifice 58 extending from the front face 50 to the rear face 54 of sufficient size to accommodate a billet 18. The front face 50 of the headstock 42 is adapted to removably attach a clamping means 62 parallel to the front face 50. The rear face 54 of the headstock 42 is adapted to removably attach a clamping, means 66 parallel to the rear face 54.

A pivotally mounted saw arbor 70 is movably mounted parallel to the first axis of rotation 46. The saw arbor 70 rotates about a second axis 48 parallel to and spaced from the first axis 46. A means 74 for rotating the saw arbor 70 at a plurality of pre-selected speeds is provided along with a means 78 for changing the pre-selected speeds at which the saw arbor 70 may be rotated. An abrasive cut-off wheel 82 is removably mounted to the saw arbor 70. A means 86 is provided for controlling the distance from the abrasive cut-off wheel to the front face 50 of the headstock 42, thereby allowing the operator to determine the length of the mult to be cut from the billet.

Figure 2:
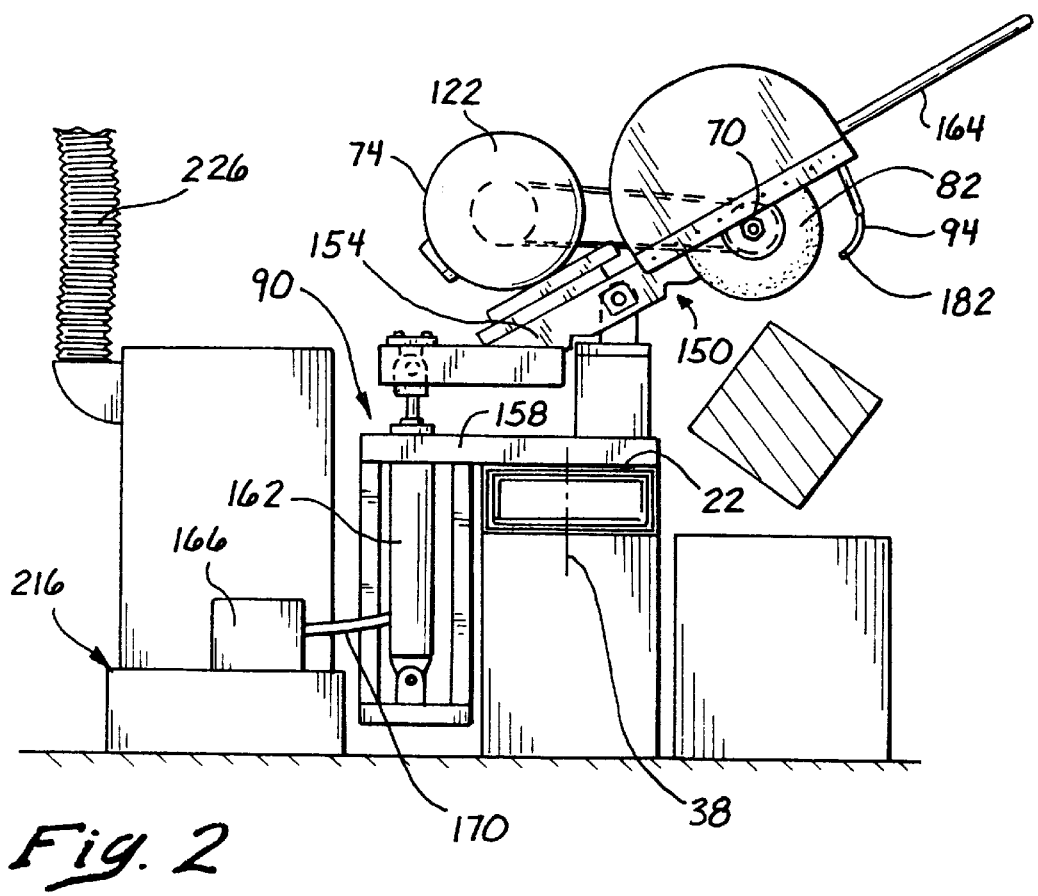
FIG. 2 is a sectional end view taken along the line 2—2 illustrating the manual cutting of a billet of irregular cross-section.
Figure 3:
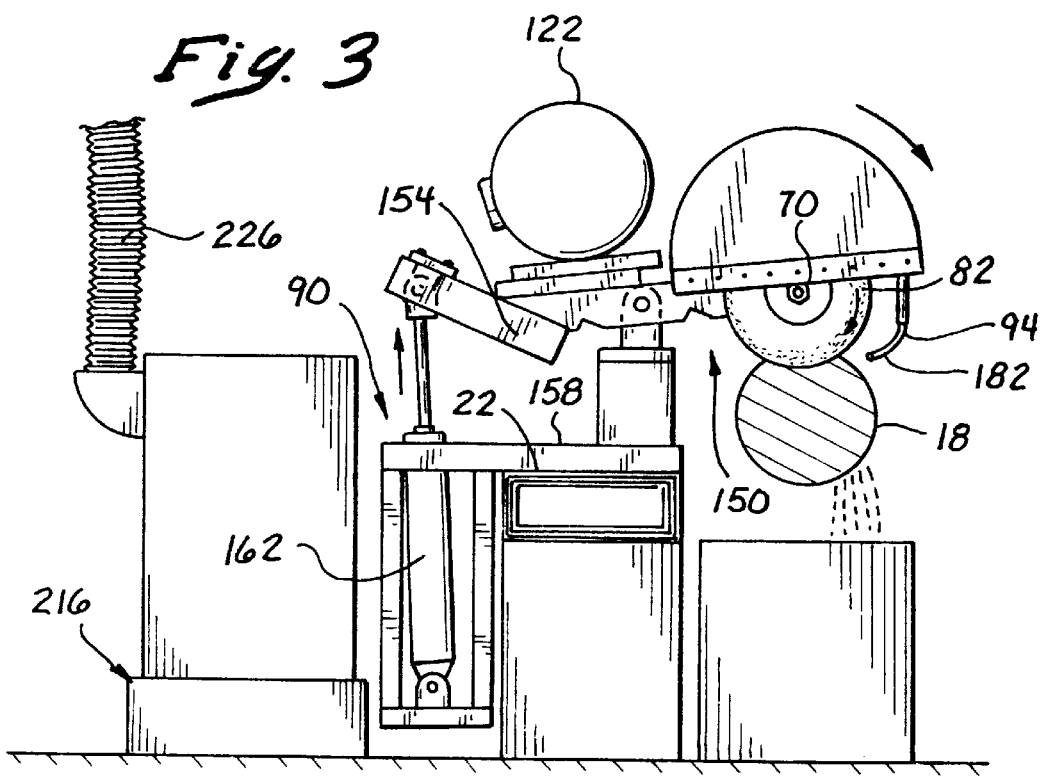
FIG. 3 is a sectional end view taken along the line 2—2 illustrating the automatic cutting of a billet of regular cross-section.
Figure 4:
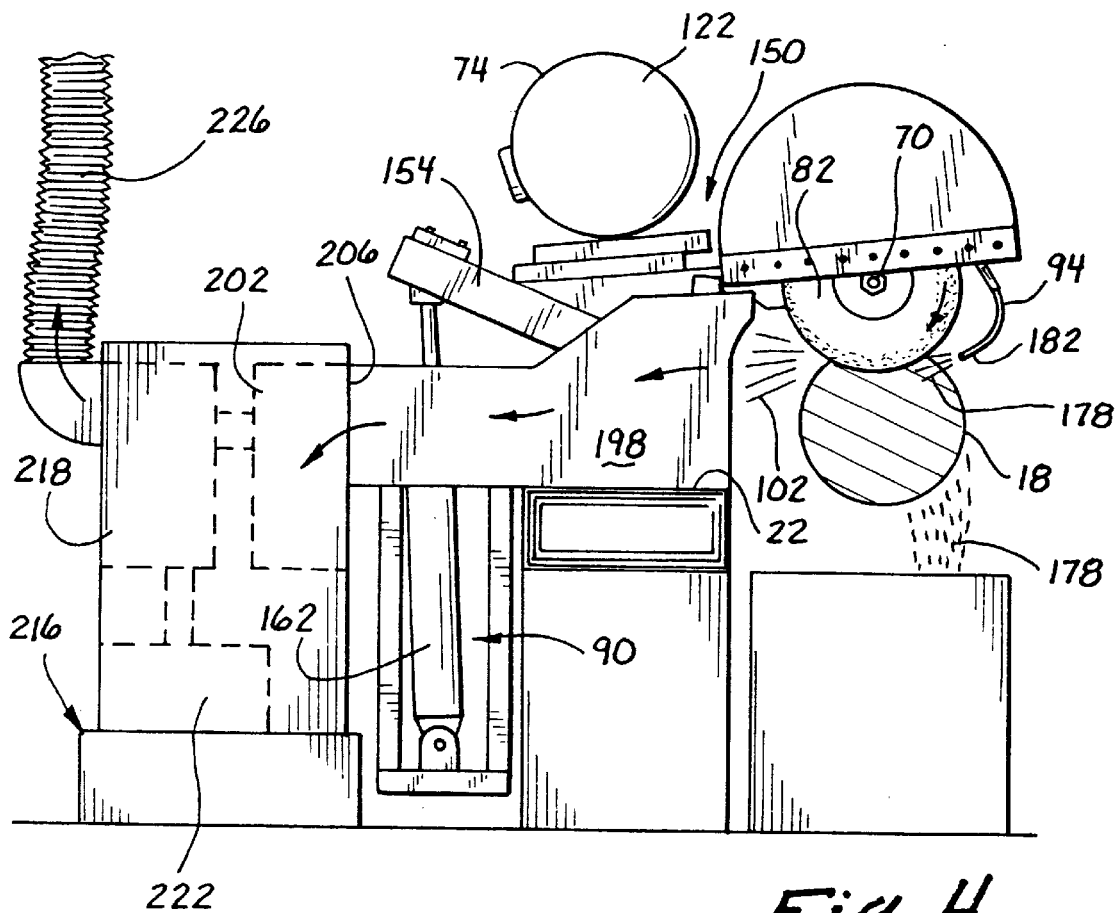
FIG. 4 is a sectional end view taken along the line 4—4 illustrating the recovery system for particulate matter and exhaust system.

As shown in FIGS. 2, 3 and 4, a means 90 is provided for causing the abrasive cut-off wheel 82 to pivot toward the billet 18, thereby causing the rotating cut-off wheel to engage the rotating billet to cut the billet into pre-determined mults while producing particulate matter. A means 94 is also provided for cooling the abrasive cut-off wheel 82 and the billet 18 and, as shown in FIG. 4, a means 98 is provided for removing and collecting particulate material 102 produced by the cutting process from the vicinity of the abrasive cut-off wheel 82.

Figure 5:
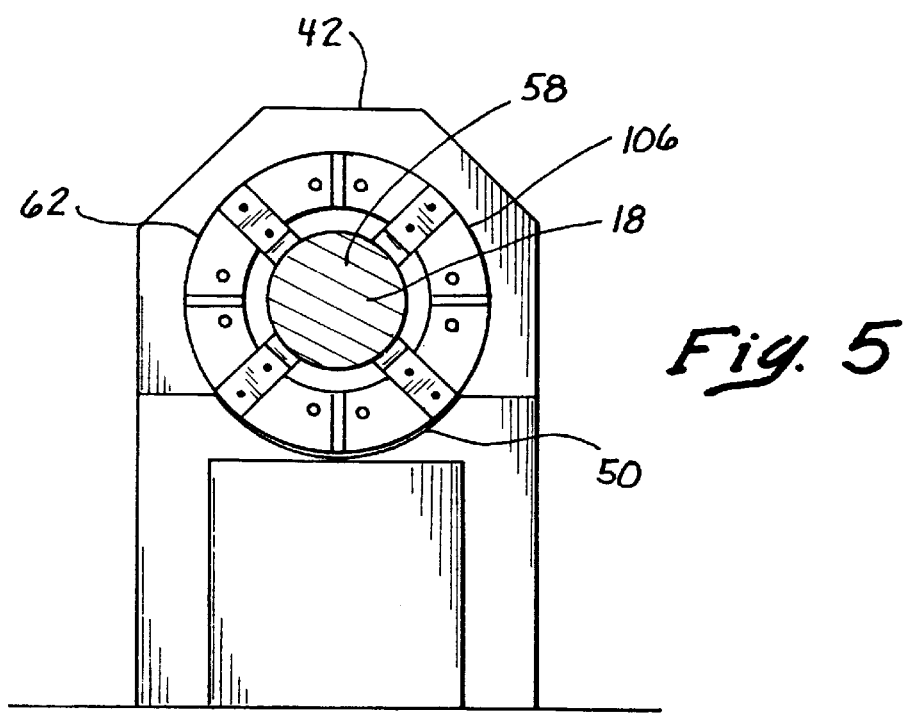
FIG. 5 is a sectional end view taken along the line 5—5 illustrating a regular billet clamped in a four-jaw chuck.

In one variation of the invention, as shown in FIGS. 1, 1a and 5, the clamping means 62 removably attached to the front face 50 of the headstock 42 comprises an independently adjustable four-jaw chuck 106. In another variation the clamping means 62 removably attached to the front face 50 of the headstock 42 comprises a self-centering three-jaw chuck (not shown). In still another variation, as shown in FIG. 1, the clamping means 66 removably attached to the rear face 54 of the headstock 42 comprises an independently adjustable four-jaw chuck 114. In yet another variation of the invention the clamping means 66 removably attached to the rear face 54 of the headstock 42 comprises a self-centering three-jaw chuck (not shown).

In another variation of the invention as shown in FIGS. 1–4, the means 74 for rotating the saw arbor 70 is an electric motor 122 capable of at least one speed. In still a further variation the means 78 for controlling the rotational speed of the saw arbor 70 further comprises a Hertz converter (not shown) connected to the electric motor 122 and a controlling means 130 connected to the Hertz converter. A means 134 is provided for determining an appropriate number of Hertz to be provided to the electric motor 122 for a desired cutting speed under varying conditions. When the diameter of the abrasive cut-off wheel 82 is diminished through use it is desired to increase the speed of the saw arbor 70, thereby maintaining a relatively constant cutting speed for an outer edge of the wheel 82. The number of Hertz provided to the electric motor 122 may be increased, thereby increasing the rotational speed of the saw arbor 70 without decreasing the power applied to the cut-off wheel 82.

In still a further variation of the invention, as illustrated in FIG. 1a, the means 86 for controlling the distance from the abrasive cut-off wheel 82 to the front face 50 of the headstock 42 comprises an incrementally controllable feed device 138 capable of displacing the cut-off wheel 82 from the front face 50 of the headstock 42. The feed device 138 maintains the orthogonal relationship between the cut-off wheel 82 and the rotational axis 46 of the headstock 42. As shown in FIG. 1, a digital display 142 illustrates the displacement of the cut-off wheel 82 from the front face 50 of the headstock 42. A switching means 146 is provided for controlling the feed device 138 based on output from the digital display 142. When the operator desires to adjust the length of the mult 14 to be cut from the billet 18 he may vary the displacement of the cut-off wheel 82 from the front face 50 of the headstock 42 using the switching means 146 and the output from the digital display 142.

In another variation of the invention, as shown in FIGS. 2, 3 and 4, the means 90 for causing the abrasive cut-off wheel 82 to pivot toward the billet 18 comprises a pivotal mounting 150 for the saw arbor 70 and the means 74 for rotating the saw arbor 70. The pivotal mounting 150 is movably mounted parallel to the machine bed 26 and includes a pivoting portion 154 and a non-pivoting portion 158. A hydraulic cylinder 162 is disposed between the pivoting portion 154 and the non-pivoting portion 158 of the pivotal mounting 150. A hydraulic pump 166, hydraulic fluid, valving, hoses 170, and control means 174 (FIG. 1) are provided to permit the hydraulic cylinder 162 to cause the cut-off wheel 82 to engage the billet 18 with a predetermined amount of force and to maintain such engagement as the portion of the billet 18 to be cut becomes smaller.

A means 178 (FIG. 1) is provided for disengaging the hydraulic cylinder 162 from the pivotal mounting 150 for the saw arbor 70 so that the cut-off wheel 82 may be manually pivoted toward and away from the billet 18. As shown in FIG. 2, when the operator desires to cut a billet 18 of irregular cross-section, the pivotal mounting 150 for the saw arbor 70 may be disconnected from the hydraulic cylinder 162. This permits the operator to manually apply pressure by means of a handle 164 to cause the cut-off wheel 82 to engage the billet 18 as may be required by the shape of the billet 18.

In still another variation, as shown in FIGS. 1–4, the means 94 for cooling the abrasive cut-off wheel 82 and the billet 18 further comprises cooling fluid 178 and a nozzle 182 fixedly attached to the pivoting portion 154 of the pivotal mounting 150 for the saw arbor 70. The nozzle 182 is adjustable so that cooling fluid 178 may be directed to the cut-off wheel 82 adjacent the point at which the wheel 82 engages the billet 18. A cooling fluid pump 186 is provided that is capable of producing at least one pressure level, as is a fluid reservoir 190 and tubing 194 connecting the reservoir 190 to the pump 186 and connecting the pump 186 to the nozzle 182. A means 184 is provided for collecting cooling fluid 178 from the vicinity of the cut-off wheel 82 and returning the fluid 178 to the reservoir 190.

In yet another variation of the invention, as shown in FIGS. 1b and 4, the means 98 for removing and collecting particulate material 102 produced by the cutting process from the vicinity of the abrasive cut-off wheel 82 comprises a collection chute 198 positioned adjacent the point at which the cut-off wheel 82 engages the billet 18 and a vacuum system 202. The vacuum system 202 has an intake end 206 and an exhaust end 210. A hose 214 connects the chute 198 to the intake end 206 of the vacuum system 202 and a separator unit 218 is connected to the exhaust end 210 of the vacuum system 202. The separator unit 218 is capable of removing particulate matter 102 from the air handled by the vacuum system 202 and depositing the particulate matter 102 in a container 222. A conveyor section 216 is located beneath the vacuum system 202 and separator unit 218. The conveyor section 216 enables the vacuum system 202 and separator unit 218 to move slidably with the pivotal mounting 150 for the saw arbor 70. An exhaust system 226 ducts the air from the separator unit 218 to a location remote from apparatus 10 for cutting mults 14 from billets 18.

The invention includes a method for cutting mults 14 from billets 18 of substantially regular cross-section. The method comprises selecting a billet 18 having a substantially regular cross-section and clamping the billet 18 in the rotating headstock 42 using the three-jaw chuck mounted to the front face 50 of the headstock 42 and the three-jaw chuck mounted to the rear face 54 of the headstock 42. The clamping of the billet 18 is then adjusted using an indicating device 226 to minimize rotational wobble of the billet 18.

Next the displacement of the cut-off wheel 82 from the front face 50 of the headstock 42 is set using the digital display 142 and switching means 146 to determine the point at which to cut the billet 18.

The operator then determines the appropriate number of Hertz to be input to the means 74 for rotating the saw arbor 70 based on the cut-off wheel 82 diameter and desired cutting speed. The determined number of Hertz is next input to the means 74 for rotating the saw arbor 70 and the means 94 for cooling the abrasive cut-off wheel 82 and fluid recovery system is activated. Next, the means 98 for removing and collecting particulate material 102 produced by the cutting process from the vicinity of the abrasive cut-off wheel 82 is activated and the means 90 for causing the abrasive cut-off wheel 82 to pivot toward the billet 18 is engaged. The operator then monitors the cutting of the mult 14 from the billet 18.

The invention also includes a method for cutting mults 14 from billets 18 of irregular cross-section. The method comprises selecting a billet 18 having an irregular cross-section and clamping the billet 18 in the rotating headstock 42 using the four-jaw chuck 106 mounted to the front face 50 of the headstock 42 and the four-jaw chuck 114 mounted to the rear face 54 of the headstock 42. The clamping of the billet 18 is then adjusted using an indicating device (not shown) to minimize rotational wobble of the billet 18. The operator then sets the displacement of the cut-off wheel 82 from the front face 50 of the headstock 42 using the digital display 142 and switching means 146 to determine the point at which to cut the billet 18.

Next the operator determines the appropriate number of Hertz to be input to the means 74 for rotating the saw arbor 70 based on the cut-off wheel 82 diameter and desired cutting speed. The appropriate number of Hertz to be input to the means 70 for rotating the saw arbor 74 is then provided. The operator next activates the means 94 for cooling the abrasive cut-off wheel 82 and fluid recovery system. Next, the means 98 for removing and collecting particulate material 102 produced by the cutting process from the vicinity of the abrasive cut-off wheel 82 is activated. The operator then causes the abrasive cut-off wheel 82 to pivot toward the billet 18 by manually pulling the handle 164 removably attached to the pivoting portion 154 of the pivotal mounting 150. The operator pulls the handle 164 toward the rotating billet 18 so as to maintain an even cutting pressure on the billet 18 while monitoring the cutting of the mult 14 from the billet 18.

I claim:

1. An apparatus for cutting mults from a billet in the form of an elongated casting of a high strength alloy, said apparatus comprising:

means for removably holding and rotating said billet about a first axis, said axis extending through an elongated extent of the billet;

means for pivotally mounting a saw arbor disposed to rotate about a second axis parallel to and spaced from said first axis;

an abrasive cut-off wheel removably mounted to the saw arbor;

means for rotating the saw arbor at a plurality of pre-selected speeds;

means for changing the pre-selected speeds at which the saw arbor may be rotated;

means for adjusting a displacement of the abrasive cut-off wheel from the means for holding the billet along the first axis of the billet, thereby allowing an operator to determine a length of the mult to be cut from the billet;

means for causing the abrasive cut-off wheel to pivot toward the billet, thereby causing the rotating cut-off wheel to engage the rotating billet to cut the billet into pre-determined mults while producing particulate matter; and means for cooling the abrasive cut-off wheel and the billet.

2. An apparatus for cutting mults from a billet in the form of an elongated casting of a high strength alloy, said apparatus comprising:

a horizontal mounting surface;

a machine bed having a planar surface disposed parallel to the mounting surface;

said planar surface having a long axis and a short axis;

a rotating headstock fixedly attached to the machine bed and having a first axis of rotation parallel to the long axis of the planar surface;

said headstock having a front face and a rear face, said faces being parallel to each other and orthogonal to the long axis of the planar surface;

said headstock capable of providing rotation at least one speed and capable of providing rotation in at least one direction;

said headstock having an orifice extending from the front face to the rear face, said orifice being of a size sufficient to accommodate a billet;

said front face adapted to removably attach a clamping means parallel to the front face;

said rear face adapted to removably attach a clamping means parallel to the rear face;

a pivotally mounted saw arbor movably mounted parallel to the first axis of rotation, said saw arbor disposed to rotate about a second axis parallel to and spaced from said first axis;

a means for rotating said saw arbor at a plurality of pre-selected speeds;

means for changing the pre-selected speeds at which the saw arbor may be rotated;

an abrasive cut-off wheel removably mounted to said saw arbor;

means for adjusting a distance from the abrasive cut-off wheel to the front face of the headstock thereby allowing an operator to determine length of the mult to be cut from the billet;

means for causing the abrasive cut-off wheel to pivot toward the headstock, thereby causing the rotating cut-off wheel to engage the rotating billet to cut the billet into pre-determined mults while producing particulate matter;

means for cooling the abrasive cut-off wheel and the billet; and means for removing and collecting particulate material produced by the cutting process from a vicinity of the abrasive cut-off wheel.

3. An apparatus for cutting mults from a billet as described in claim 2, wherein the clamping means removably attached to the front face of the headstock comprises an independently adjustable four-jaw chuck.

4. An apparatus for cutting mults from a billet as described in claim 2, wherein the clamping means removably attached to the front face of the headstock comprises a self-centering three-jaw chuck.

5. An apparatus for cutting mults from a billet as described in claim 2, wherein the clamping means removably attached to the rear face of the headstock comprises an independently adjustable four-jaw chuck.

6. An apparatus for cutting mults from a billet as described in claim 2, wherein the clamping means removably attached to the rear face of the headstock comprises a self-centering three-jaw chuck.

7. An apparatus for cutting mults from a billet as described in claim 2, wherein the means for rotating the saw arbor is an electric motor capable of at least one speed.

8. An apparatus for cutting mults from a billet as described in claim 7, wherein the means for adjusting the rotational speed of the saw arbor further comprises:

a Hertz converter frequency controller connected to the electric motor;

an adjusting means connected to the Hertz converter; and whereby, when the diameter of the abrasive cut-off wheel is diminished through use and it is desired to increase the speed of the saw arbor, thereby maintaining a relatively constant cutting speed for an outer edge of the wheel, the number of Hertz provided to the electric motor may be increased, thereby increasing the rotational speed of the saw arbor without decreasing the power applied to the cut-off wheel.

9. An apparatus for cutting mults from a billet as described in claim 2, wherein the means for adjusting the displacement of the abrasive cut-off wheel from the front face of the headstock comprises:

an incrementally adjustable feed device capable of displacing the cut-off wheel from the front face of the headstock while maintaining the orthogonal relationship between the cut-off wheel and the rotational axis of the headstock;

a digital display providing an output illustrating a displacement of the cut-off wheel from the front face of the headstock;

a switching means permitting the operator to adjust the feed device based on perceived output from the digital display; and whereby, when the operator desires to adjust the length of the mult to be cut from the billet he may vary the displacement of the cut-off wheel from the front face of the headstock using the switching means and the perceived output from the digital display.

10. An apparatus for cutting mults from a billet as described in claim 2, wherein the means for causing the abrasive cut-off wheel to pivot toward the headstock comprises:

a pivotal mounting for the saw arbor and the means for rotating said saw arbor;

said pivotal mounting being movably mounted parallel to the machine bed and including a pivoting portion and a non-pivoting portion;

a hydraulic cylinder for pivoting the saw arbor;

a hydraulic pump, hydraulic fluid, valving, hoses, and control means, said hydraulic pump pressurizing the hydraulic fluid flowing through the valving hoses, and control means to provide controlled pressure hydraulic fluid to the hydraulic cylinder to cause the cut-off wheel to engage the billet with a predetermined pressure and to maintain cutting speed as the portion of the billet to be cut becomes smaller;

means for disengaging the hydraulic cylinder from the pivotal mounting for the saw arbor so that the cut-off wheel may be manually pivoted toward and away from the headstock; and whereby, when the operator desires to cut a billet of irregular cross-section, the pivotal mounting for the saw arbor may be disengaged from the hydraulic cylinder, thereby permitting the operator to manually apply pressure to cause the cut-off wheel to engage the billet as may be required by the shape of the billet.

11. An apparatus for cutting mults from a billet as described in claim 2, wherein the means for cooling the abrasive cut-off wheel and the billet further comprises:
   cooling fluid;
   a nozzle fixedly attached to a pivoting portion of a pivotal mounting for the saw arbor;
   said nozzle being adjustable so that cooling fluid may be directed to the cut-off wheel adjacent the point at which said wheel engages the billet;
   a cooling fluid pump providing at least one pressure level, a fluid reservoir and tubing connecting the reservoir to the pump and connecting the pump to the nozzle;
   means for collecting cooling fluid from a vicinity of the cut-off wheel and returning the fluid to the reservoir.

12. An apparatus for cutting mults from a billet as described in claim 2, wherein the means for removing and collecting particulate material produced by the cutting process from the vicinity of the abrasive cut-off wheel comprises:
   a collection chute positioned adjacent the point at which the cut-off wheel engages the billet;
   a vacuum system having an intake end and an exhaust end;
   a hose connecting the chute to the intake end of the vacuum system;
   a separator unit connected to the exhaust end of the vacuum system;
   said separator unit being capable of removing particulate matter from the air handled by the vacuum system and depositing the particulate matter in a container;
   a conveyor section disposed beneath the vacuum system and separator unit, said conveyor section enabling the vacuum system and separator unit to move slidably with a pivotal mounting for the saw arbor; and
   an exhaust system ducting the air from the separator unit to a location remote from apparatus for cutting mults from billets.

13. A method for cutting mults from a billet of substantially regular cross-section, comprising:
   selecting a billet having a substantially regular cross-section;
   clamping the billet in a rotating headstock using a three-jaw chuck mounted to a front face of the headstock and a four-jaw chuck mounted to a rear face of the headstock;
   adjusting the clamping of the billet using an indicating device to minimize rotational wobble of the billet;
   setting a displacement of an abrasive cut-off wheel from front face of the headstock using a digital display and a switching means to determine a point at which to cut the billet;
   providing an appropriate number of Hertz to be input the means for rotating a saw arbor based on a cut-off wheel diameter and a desired cutting speed;
   activating a means for cooling the abrasive cut-off wheel and a fluid recovery system;
   activating a means for removing and collecting particulate material produced by a cutting process from a vicinity of the abrasive cut-off wheel;
   activating a means for causing the abrasive cut-off wheel to pivot toward the headstock; and
   monitoring the cutting of the-mult from the billet.

14. A method for cutting mults from a billet of irregular cross-section, comprising
   selecting a billet having an irregular cross-section;
   clamping the billet in a rotating headstock using a four-jaw chuck mounted to a front face of the headstock and a four-jaw chuck mounted to a rear face of the headstock;
   adjusting the clamping of the billet using an indicating device to minimize rotational wobble of the billet;
   setting a displacement of an abrasive cut-off wheel from the front face of the headstock using a digital display and a switching means to determine a point at which to cut the billet;
   providing an appropriate number of Hertz to be input the means for rotating a saw arbor based on a cut-off wheel diameter and a desired cutting speed;
   activating a means for cooling the abrasive cut-off wheel and a fluid recovery system;
   activating a means for removing and collecting particulate material produced by a cutting process from a vicinity of the abrasive cut-off wheel;
   causing the abrasive cut-off wheel to pivot toward the headstock by manually pulling a handle removably attached to a pivoting portion of a pivotal mounting of the saw arbor toward the rotating billet so as to maintain an even cutting speed on the billet; and
   monitoring the cutting of the mult from the billet.

* * * * *